Nov. 11, 1930.  A. A. HERZBERG ET AL  1,781,109
SLIP SPINDLE DEVICE
Filed Oct. 8, 1929  4 Sheets-Sheet 3
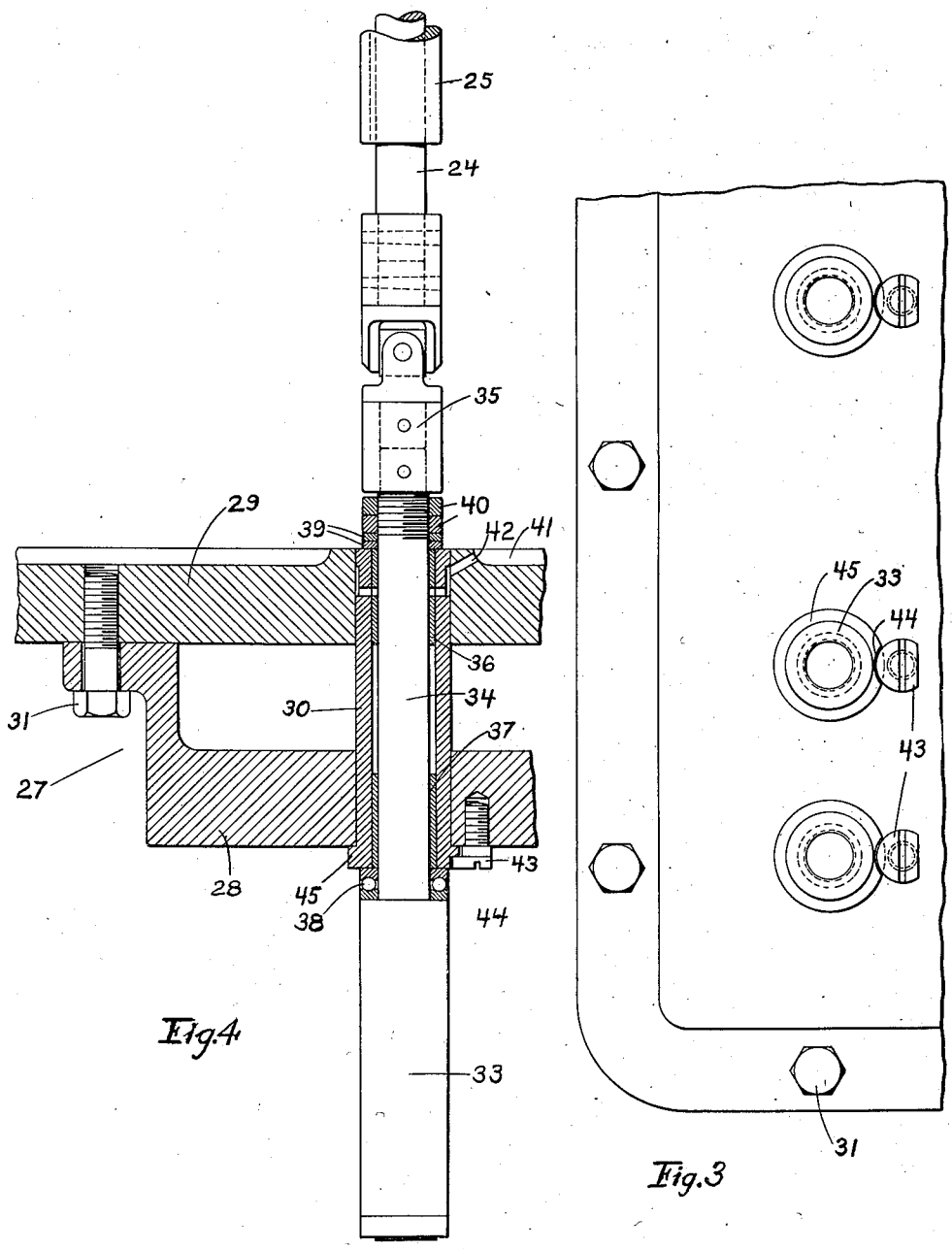
Inventors
Anton A. Herzberg
Henry O. Schultz
By Attorneys
Nathan & Bowman

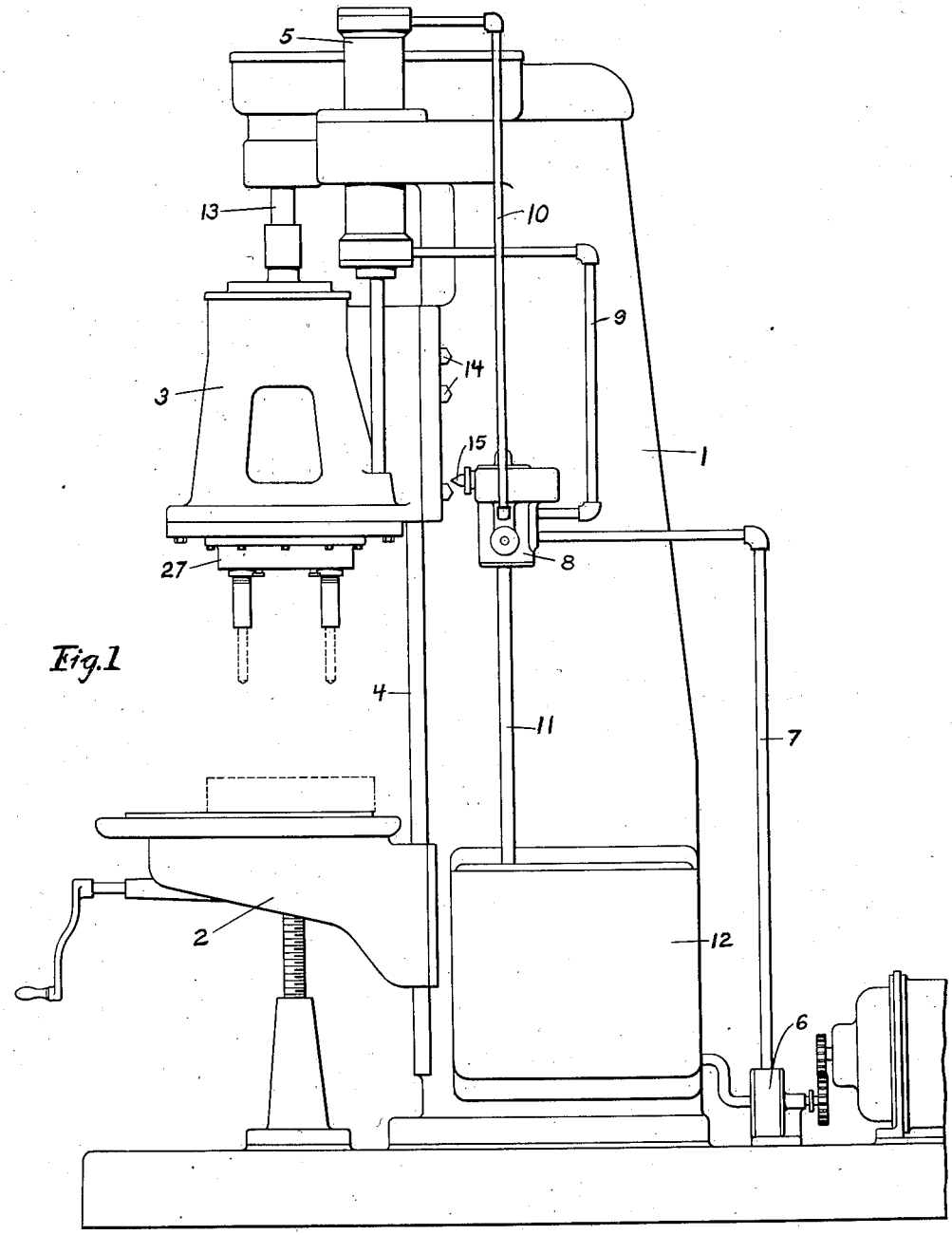

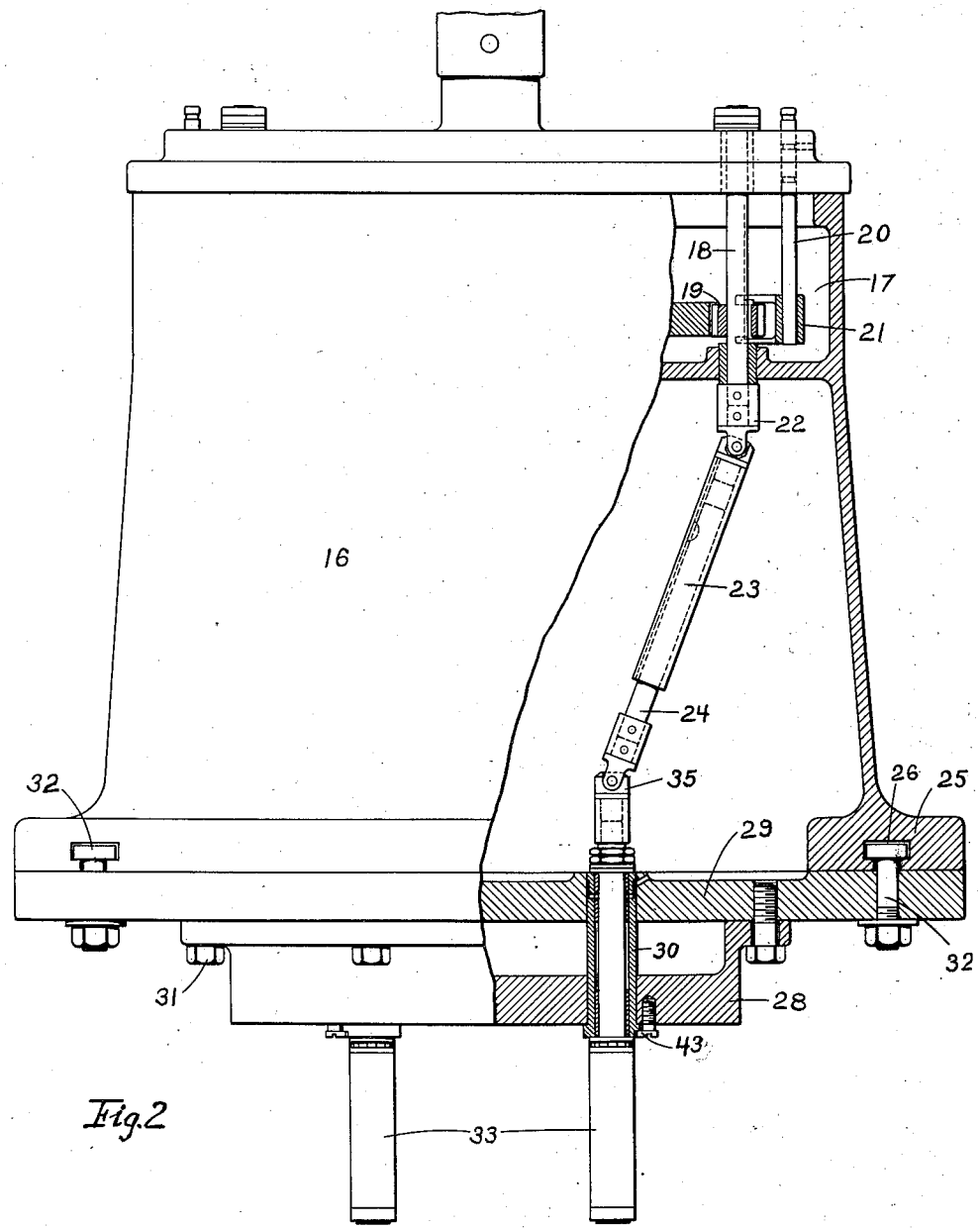

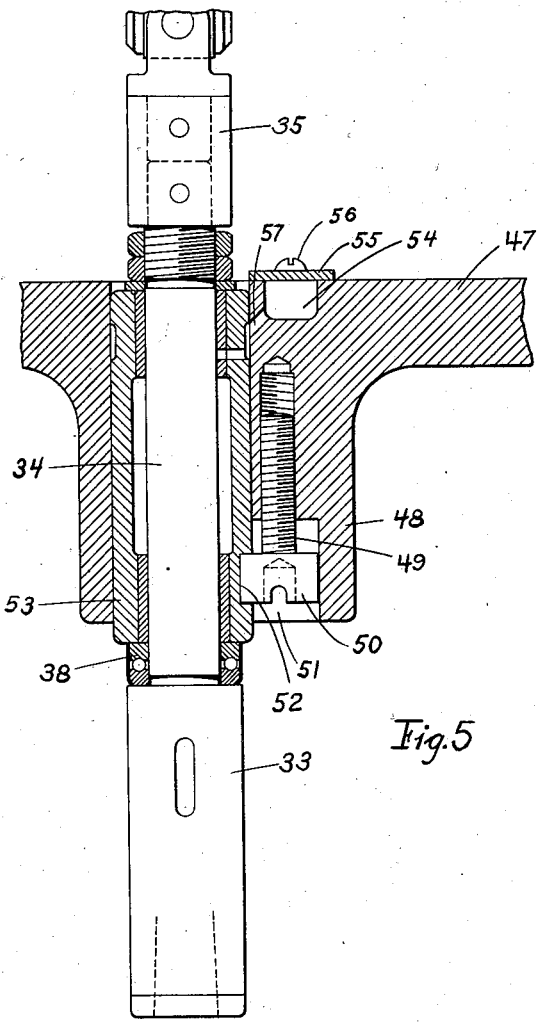
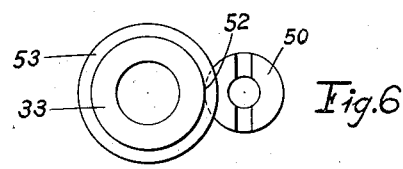

Patented Nov. 11, 1930

1,781,109

UNITED STATES PATENT OFFICE

ANTON A. HERZBERG, OF WAUKESHA, AND HENRY O. SCHULTZ, OF MILWAUKEE, WISCONSIN, ASSIGNORS TO THE NATIONAL AUTOMATIC TOOL COMPANY, OF RICHMOND, INDIANA, A CORPORATION OF INDIANA

SLIP SPINDLE DEVICE

Application filed October 8, 1929. Serial No. 398,134.

This invention concerns certain improvements in machine tool drill heads and the individual spindle mechanism and supporting means therefor which provides a simple and economical means for rendering the drill spindles selectively positionable thereon in accordance with definite arrangements required in the machining of various different types of work pieces encountered in normal production work, and possessing many desirable features and advantages not present in devices heretofore provided for such purposes.

The demands for increased production have long since rendered necessary the extensive use of drilling machines capable of simultaneously drilling a large number of holes definitely located and oftentimes extending over a relative large area in accordance with the particular type of work piece in production for the time being. Much research and experimentation has been devoted to these types of machines with corresponding additions and refinements resulting in a highly productive machine but necessarily large, complicated and extremely costly.

The problem of adapting machines for universal use capable of modification for utilization in machining articles of different types and lay-outs has always been a leading one in machine tool design and especially so in the more costly types of machines. In attempting to meet this problem in multiple spindle machines many competitive devices have been developed and extensively employed, the majority of so called multiple spindle head machines being provided with some sort of contrivance for this purpose constructed in accordance with the design considered by the particular manufacturer to be the most practical of those which he is free to make. Each of the designs employed have possessed certain advantages and likewise disadvantages.

Among the expedients resorted to has been that of removable and interchangeable heads but although the spindles could for one certain job be given a very rigid support, the heads and operative connections in accordance with changing designs have become so cumbersome, complicated and expensive as to in general render this method impractical.

Other forms involved various applications of the general idea of a spindle mounted on an open slotted bracket with one or more bolts extending therethrough with the head of the bolts engageable in and slidable along T-slots in the drill head. This presents a flexible construction and affords a wide variety of set-ups but is lacking in rigidity; is susceptible to loosening and displacement; and required careful and painstaking labor to accurately associate the many spindles in correct relative position.

A general class of constructions of more recent development and which are probably most widely employed are based upon the use of a cluster plate in conjunction with the bracket or arm type of spindle support having the slotted opening noted above. In these organizations the arms are secured wholly or partly on the cluster plate dependent upon whether the cluster plate covers the entire under area of the head or merely is a plate centrally suspended within the open end of the head. The primary feature of these arrangements is the employment of dowel pins for definitely locating the spindle brackets on the cluster plates in accordance with a particular set-up. The openings through which the spindle drive connections extend must, for a practical construction permitting the removal of the plate or individual removal of one or more spindles for insertion in another location, be of such extent as to permit the lower universal joint of the spindle driving means and directly connected parts to pass through the opening.

This opening therefore in previous cluster plate constructions has been of no assistance with respect to lateral support of the spindle the accurate location of the spindles being dependent upon the accuracy of location of the dowel pin holes both in the cluster plate and in the spindle arms and as to the latter they are required for practicability to be exactly located with respect to the drill spindle to permit interchangeability. This degree of accuracy has, however, been both expensive and difficult of attainment. The accuracy is further disturbed by wear on the holes and, being often close together, are subject to confusion. These defects with respect to the use of dowel pins are, of course, also present when employed in connection with arms directly secured on the head.

The present invention offers the advantages of a cluster plate and associated spindle mechanism in which the spindles are closely and directly fitted within openings in the cluster plate and are thereby positively held against lateral displacement. The spindles are made readily withdrawable by the provision of a sleeve bearing means forming a part of the spindle assembly. With such an arangement the opening through the cluster plate is sufficiently large to permit the passage of the largest part of the spindle driving means required to pass therethrough which is normally the lower universal joint. When, however, the spindle is in place the bearing is close fitting and accurately located.

The cluster plates can be easily machined with the spindle holes properly and accurately located in accordance with a specific required set-up and can be quickly assembled on the head. In general, however, the arrangement is made even more simple and changes in set-up quickly made by providing each cluster plate with several sets of holes enabling the same cluster plate to be selectively used for any one of many predetermined set-ups.

The individual spindle assemblies are interchangeable and the simplicity of the attaching devices which, as will be pointed out later, also serves the function of providing a vertical adjusting means, is such as to result in a most economical and convenient arrangement. The spindles including the bearing and supporting means occupy but little area and may be arranged very closely together without the interference frequently encountered when spindle arms are employed.

A certain specific form of spindle assembly in combination with a corresponding type of cluster plate is presented by this invention which affords further advantages which in some respects are independent from and may be conveniently employed in other situations but are especially valuable in connection with the heretofore described devices and arrangement relating to drill spindles and cluster assemblies broadly.

This specific form provides very compact and convenient means for adjusting the spindle vertically. Such a property is of utmost value where a multiplicity of spindles are employed in a single head and it becomes desirable to vertically adjust the individual spindles of an assembly in order to compensate for the variable lengths of the respective drills and the frequent variation in the height of the holes and of their depth, the more common work pieces being irregular and unsymmetrical in this respect. Further, the vertical adjusting means affords a readily accessible and easy device for compensating for changes in length due to regrinding of drills or the replacement thereof.

A particular form of vertical adjusting means is presented herein which provides a compact arrangement capable of very fine and accurate adjustments and the advantages thereof, it will be recognized, may be effectively utilized in various manners and organizations other than the specific cluster arrangement of a multiple spindle drill head disclosed herein. The vertical adjusting means, however, is of particular value in the present organization and cooperates in a novel and advantageous manner with the feature of ready removability of the spindle assemblies heretofore discussed and thereby contributes much to the general compactness, sturdiness, and ease and convenience of adjustment to quickly provide a set-up for a particular job capable of drilling the required holes with a degree of accuracy and conformity to specified dimensions not attained in devices of this nature heretofore provided.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1 is an organizational view of an upright multiple spindle drilling machine; Fig. 2 is a front view of a multiple spindle head such as may be employed in a machine of the type shown in Fig. 1 with parts broken away to show specific details of the construction; Fig. 3 is a bottom plan view of a portion of a multiple spindle head; Fig. 4 is an enlarged fragmentary view of details of one form of the spindle bearing and associated mechanism; Fig. 5 shows a different form of spindle bearing and cluster plate having therein the vertical adjusting means; and Fig. 6 is a partial bottom plan view of Fig. 5.

In Fig. 1 is shown one specific type of machine in which the present invention may be advantageously employed. The drawing depicts somewhat conventionally a multiple spindle upright drilling machine including a main frame 1 having a work table 2 and a drill spindle head 3. The head 3 is vertically translatable on ways 4 through the operation of hydraulic motors 5 of which there may be two symmetrically located on opposite sides of a central vertical plane. Fluid is supplied to the motors from the motor driven pump 6 through the conduit 7 to the valve unit 8 controlling the fluid through the conduits 9 and 10 leading to opposite ends of the cylinders 5. A conduit 11 conducts exhaust fluid to the reservoir 12. Rotation is imparted to the spindles through the shaft 13 and suitable gearing in the head 3. The valve unit is automatically controlled through action of adjustable dogs 14 translatable with the head and engageable with the plunger 15 of the valve unit. The organization thus far described constitutes in its general aspects a well known type of machine and as a study of the details of this invention will disclose, merely one example of a machine in which the novel features of the invention find application.

As shown in Figs. 1 and 2 a multiple spindle head of this type may include a main frame or housing 16 of which the upper portion constitutes a gear chest having therein a large number of vertical shafts 18 deriving rotary motion through gear 19 from master gears in turn driven from the shaft 13. The gear 19, if desired, may be splined on shaft 18 and means such as the rod 20 and forked member 21 provided for individually throwing the spindles out of operation or into mesh with other gears for variable speeds. The lower end of rod 18 is provided with a universal joint 22 from which is suspended the sleeve 23 into which is splined the shaft 24 of the lower section of the spindle drive. The lower or outer end of the housing is provided with the usual flange 25 having T-slots 26 therein enabling the attachment of cluster plates or of spindle arms directly thereto.

All of the mechanism thus far described will be recognized as somewhat general and typical of common constructions in multiple drill heads, other specific arrangements being equally well adapted for use in conjunction with the specific features of the lower spindle support means about to be described.

The advantages of this invention it will be perceived can be obtained in types of machines other than vertical such as e. g. horizontal way drills and in this connection the term lower or outer end as employed in referring to parts of the head is intended merely to designate the spindle attaching or working end without reference to the particular manner in which the head may be mounted.

The details of this invention as disclosed in the broad form of Figs. 1 to 4 include a cluster plate or box 27 having upper and lower spaced sections 28 and 29 to provide a longer bearing for the sleeves 30 mounted in openings therein. The sections are secured together by means of screw bolts 31 but since this connection is normally permanent the two may be made integral if preferred or of a construction similar to Fig. 5 in which the main plate is provided with projecting bosses for the individual spindle bearings. The plate is removably secured to the head by T-bolts 32 engaging in the usual slots 26.

Before insertion of the spindles in the plate openings the spindles are pre-assembled in the sleeves 30. This is done in the usual manner the construction including the tool holding spindle portion 33 having the reduced shank portion 34 to which is secured the joint 35 having the shaft 24 secured to the opposite section of the joint. Upper and lower bushings 36 and 37, supply bearings for the shank within the sleeve 30. A ball thrust bearing 38 takes the thrust during working operation and suitable thrust washers 39 and adjustable lock nuts 40 secure the spindle in the sleeve 30 and provide for adjustment and vertical suspension.

Preferably the upper section of the cluster box is provided with shallow oil pockets 41 having openings 42 adapted to communicate with suitable grooves and passages in the sleeve 30 and in upper bushing 36 to supply lubricant to the spindle when in assembled position.

For convenient assembling the cluster box is first secured to the head and the respective spindle assemblies including the sleeve 30 and lower spindle driving section are then inserted in the openings with the shaft 24 slipped into sleeve 23 and the sleeve 30 forced into the opening in which it snugly fits. A half head screw 43 is then turned into place engaging in the milled arc-shaped opening 44 in the flange 45 of the sleeve 30. The screw 43 thus serves the double function of preventing downward movement of the sleeve 30 or tendency to rotate under the influence of the rotating spindle.

In the arrangement disclosed the spindle openings in the cluster plate are sufficiently large relative to the joint 35, upper thrust washers and any associated mechanism normally employed in the lower spindle drive section as to permit their ready insertion through the opening. With the sleeve 30 forming a unitary part of the assembly and serving to completely occupy the area of the opening the result is a quickly assembled set-up with the spindles held rigidly against any lateral displacement.

The openings may be quickly and accurately bored in a cluster plate on the centers that are required to be drilled or tapped. In this respect several sets of openings may often be provided in the same cluster plate and the spindle assemblies being similar and interchangeable may be easily shifted from one set of openings to another and a new set-up quickly obtained.

Fig. 3 shows an interchangeable cluster plate having a different arrangement of spindles, it being apparent that as many varieties of spindle set-up may be made and employed as the change in operations makes desirable.

Another advantage accruing from the individually compact assemblies is that of being able to locate the spindles very closely together without interference with each other such as is often incurred where the construction requires the use of auxiliary spindle arms.

Figs. 5 and 6 show a particularly advantageous form of spindle assembly and cluster plate which provides for individual vertical adjustment of the respective spindles forming an assembly. In this form the cluster box is preferably made of a single plate 47 having bosses 48 projecting outwardly therefrom providing sturdy elongated bearing supports for the spindles. An adjusting screw 49 is screw threaded into a lateral extension of the boss and has an enlarged head 50 operative in a counterbore 51 parallel to and intersecting the main bore for the spindle bearing. The head 50 engages in an arc-shaped slot 52 milled in the side of the spindle bearing sleeve 53. Rotation of the screw serves to adjust the spindle vertically and may be employed to very exactly locate the spindle in this respect and with a minimum of manipulation of parts. The co-acting screw and sleeve means thereafter retain the spindle in adjusted position without the application of auxiliary locking means. The interlock provided by the screw head 50 engaging in a notch of the sleeve 53 prevents turning of the latter under the influence of the rotating spindle.

The upper surface of the plate 47 has therein adjacent the spindle an oil well 54 provided with a cover plate 55 held in place by screws 56. A duct 57 connects the oil well with suitable passages in the spindle sleeve and bushing for lubrication thereof.

The readily removable spindle assemblies in conjunction with the feature of vertical adjustment forming a unitary part of the assembly presents an arrangement capable of being quickly set up and adjusted to meet the requirements of a particular job.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, we claim as new and desire to secure the following combinations and elements, or equivalents thereof, by Letters Patent of United States:—

1. A multiple spindle machine tool head combining a frame; a spindle supporting plate secured to the lower face thereof having a plurality of spindle openings therein and lubricant passages connecting with said openings; a plurality of spindle drive members adapted to be power rotated carried by said frame; interchangeable spindle assemblies removably mounted in certain of said openings each of said assemblies comprising a supporting sleeve insertable in any one of said openings providing spindle bearing means, a spindle adapted to be preassembled in said sleeve, a driven member having a flexible joint with said spindle, means for extensibly and separably connecting said driven member with one of said drive members and means for removably securing said sleeve in any one of said openings whereby said assembly may be withdrawn as a unit, each of said sleeve and spindle bearing means having lubricant openings adapted to communicate with the respective passages in said supporting plate.

2. A multiple spindle drill head combining a frame; a plurality of spindles mounted therein; means for supporting said spindles comprising a plate secured to the lower portion of said frame and having openings therein; spindle bearing sleeves adjustable in said openings and rotatably supporting said spindles and holding them against axial movements, said bearing sleeves being removable whereby each spindle and its sleeve may be outwardly withdrawn through its respective opening; and a single screw device for each spindle having one portion engaging a portion of said sleeve and another portion threaded into said plate to adjust said sleeve, to lock said sleeve against rotation in said plate and to transmit to said plate the thrust incident to a drilling operation.

3. A multiple spindle drill head combining a frame; a plurality of spindles mounted therein; means for supporting said spindles comprising a plate secured to the lower portion of said frame and having openings therein; spindle bearing sleeves adjustable in said openings and rotatably supporting said spindles and holding them against axial movements whereby each spindle and its sleeve may be outwardly withdrawn through its respective opening; a screw threaded into a bore in said plate having its head fitted within an enlarged portion of said bore and engaging opposed walls of a notch in said sleeve, said screw serving to adjust said sleeve axially, to hold said sleeve against rotation and to transmit to said plate the thrust incident to a drilling operation.

In witness whereof, we have hereunto subscribed our names.

ANTON A. HERZBERG.
HENRY O. SCHULTZ.